United States Patent [19]

Murase et al.

[11] Patent Number: 5,408,387
[45] Date of Patent: Apr. 18, 1995

[54] EDGE LIGHT PANEL AND ITS PRODUCTION

[75] Inventors: Shinzo Murase; Hirokazu Matsui, both of Shiga, Japan

[73] Assignee: Meitaku System Co., Ltd., Japan

[21] Appl. No.: 988,412

[22] Filed: Nov. 30, 1992

[30] Foreign Application Priority Data

Nov. 30, 1991 [JP] Japan .................. 3-342113

[51] Int. Cl.⁶ .............................................. F21V 8/00
[52] U.S. Cl. .................................. 362/31; 362/327; 362/330; 362/332
[58] Field of Search ............... 359/48, 49; 362/26, 362/27, 31, 327, 330, 331, 333, 339, 332

[56] References Cited

U.S. PATENT DOCUMENTS

| | | | |
|---|---|---|---|
| 2,120,813 | 6/1938 | Riotte | 362/26 |
| 2,886,911 | 5/1959 | Hardesty | 362/31 |
| 2,900,949 | 8/1959 | Baker | 362/26 |
| 3,994,564 | 11/1976 | Somogyi | 359/49 |
| 4,167,307 | 9/1979 | Cirkler et al. | 359/50 |
| 4,860,171 | 8/1989 | Kojima | 362/31 |
| 4,888,201 | 12/1989 | Veenvliet et al. | 427/38 |
| 4,936,659 | 6/1990 | Anderson . | |
| 4,985,809 | 1/1991 | Matsui et al. | 362/31 |
| 4,989,933 | 2/1991 | Duguay . | |
| 5,057,974 | 10/1991 | Mizobe | 362/31 |
| 5,093,765 | 3/1992 | Kashima et al. | 362/31 |
| 5,134,549 | 7/1992 | Yokohama | 362/31 |

FOREIGN PATENT DOCUMENTS

| | | | |
|---|---|---|---|
| 834837 | 3/1952 | Germany | 362/31 |
| 8914233 | 3/1990 | Germany . | |
| 5838186 | 8/1981 | Japan . | |
| 6075907 | 9/1983 | Japan . | |
| 6362104 | 9/1986 | Japan . | |
| 2269382 | 4/1989 | Japan . | |
| 3118594 | 9/1989 | Japan . | |
| 396091 | 7/1933 | United Kingdom | 362/31 |
| 929959 | 6/1963 | United Kingdom | 362/327 |
| 2247309 | 2/1992 | United Kingdom . | |
| 2247310 | 2/1992 | United Kingdom . | |

Primary Examiner—Ira S. Lazarus
Assistant Examiner—Alan B. Cariaso
Attorney, Agent, or Firm—King & Schickli

[57] ABSTRACT

Reflective material is closely provided to cover the surfaces of a diffusing-reflection arrangements that are defined by a dot pattern on a transparent substrate, thereby fabricating an edge light panel. The diffusing-reflecting arrangements are in microspheric configurations, so that they can act as a condenser lenses, thereby achieving a much higher luminance in combination with the location of the reflective material.

9 Claims, 6 Drawing Sheets

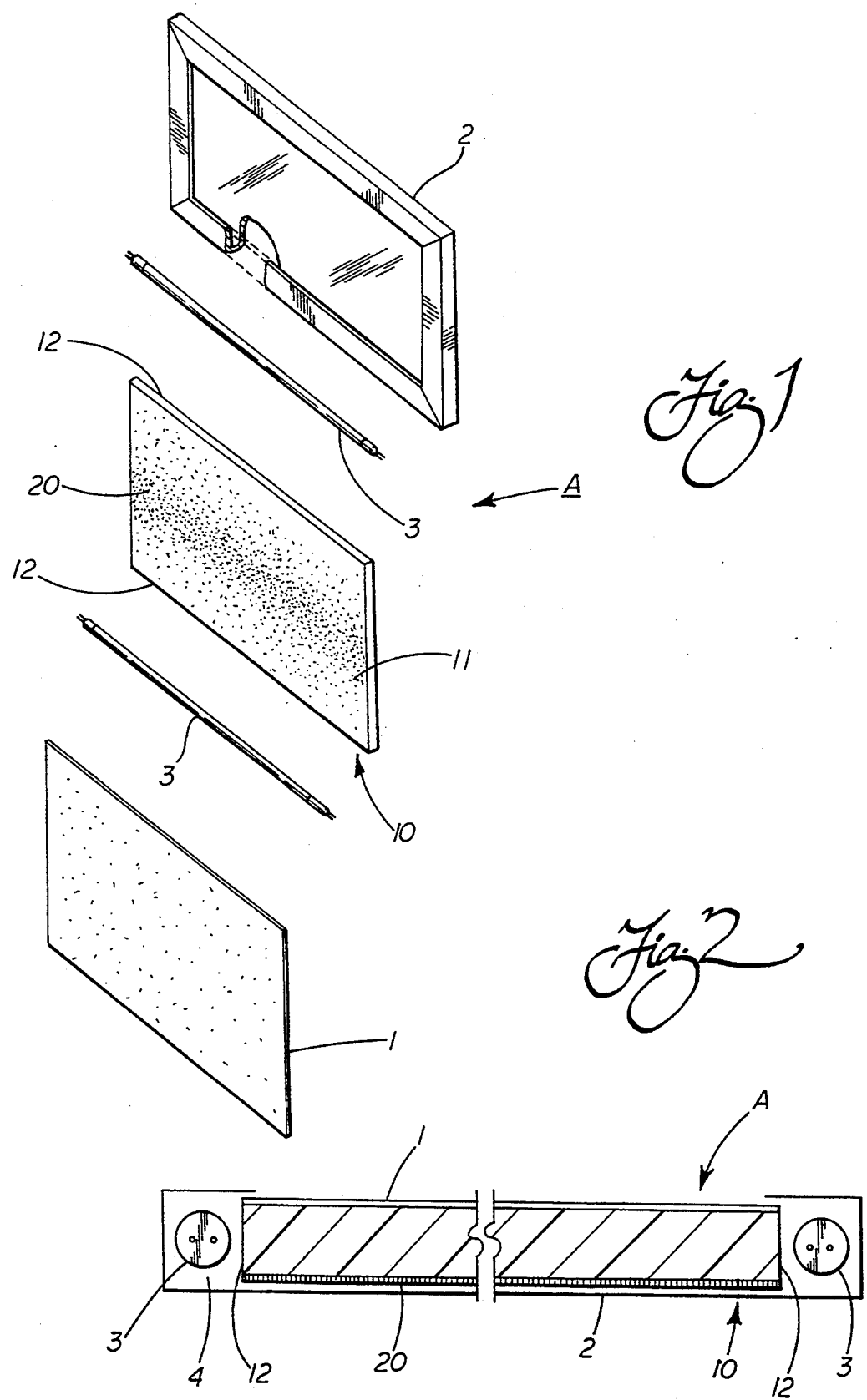

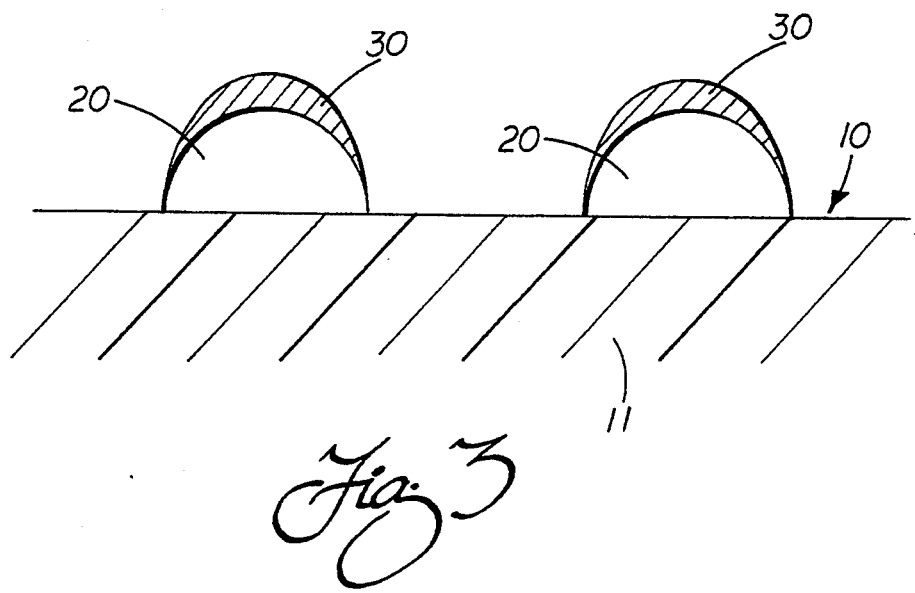
Fig. 3
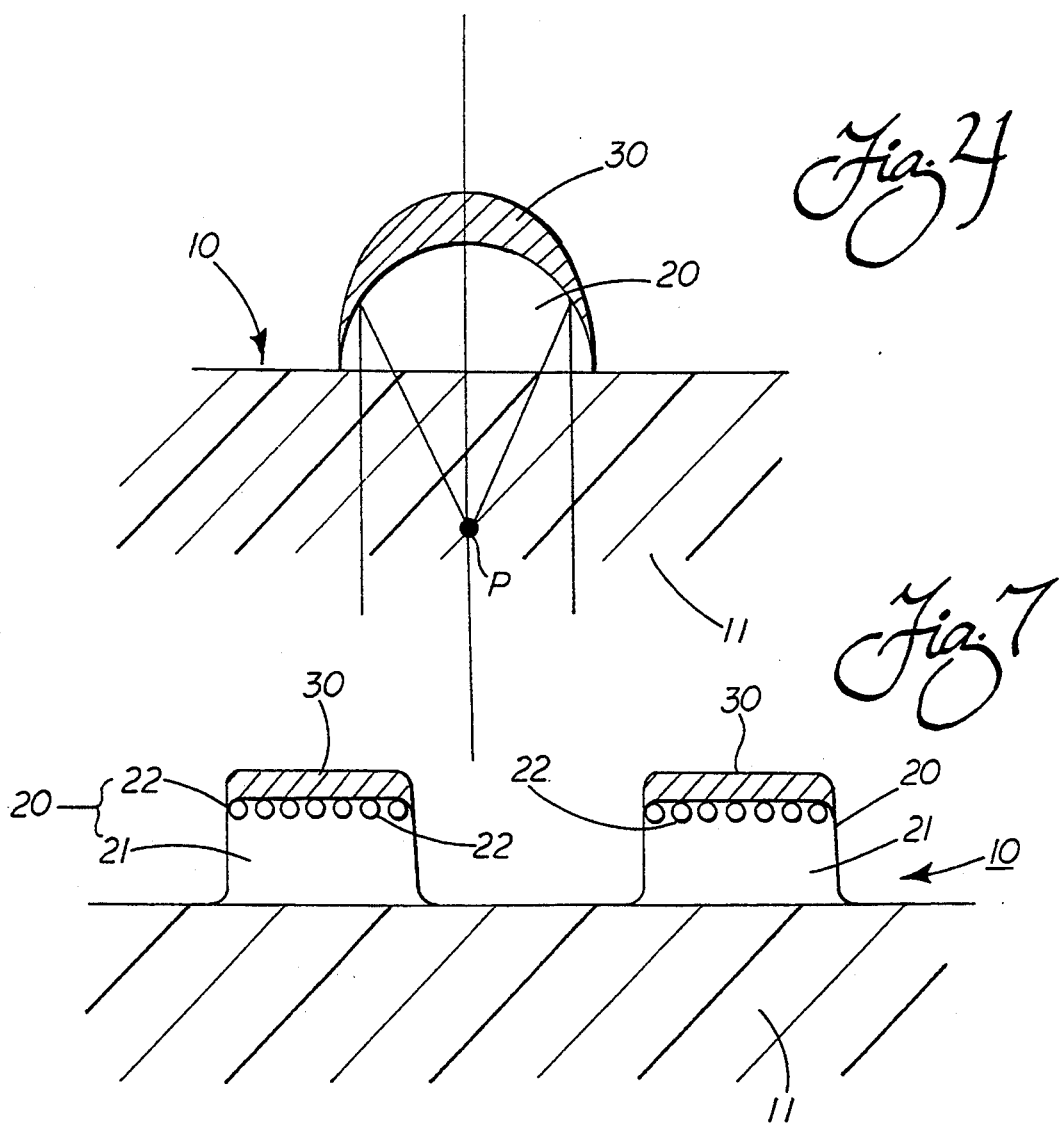
Fig. 4
Fig. 7

EDGE LIGHT PANEL AND ITS PRODUCTION

BACKGROUND OF THE INVENTION

The present invention relates to an edge light panel used on liquid crystal backlights for TV receiver sets and computers or edge light illuminators used for other backlighting purposes and a method of fabricating such an edge light panel.

For such edge light illuminators including liquid crystal backlights, use is made of an edge light panel for diffusely reflecting light from a primary light source mounted on the light-incident edge surface within the plane defined thereby for illumination and guiding the light in a certain direction within the plane.

Most generally used diffusing-reflection means are a given dot pattern screen-printed on a transparent substrate of acrylic resin, in which the dots are arranged in an equi-interval matrix array, as shown in JP-A-63-62104 filed by the inventors, in such a way that the dot percent is increased in a stepless manner as the dots are spaced away from the light source. This edge light panel is best suited for use on a liquid crystal backlight, because luminance and uniformity in particular are ensured.

However, the liquid crystal backlight using such an edge light panel is limited to monochromatic liquid crystal displays, and cannot be applied to multi-color liquid crystal displays, because they are required to have a considerably increased luminance.

Some improvement in luminance may be achieved by increasing the number of primary light sources used, for instance, by providing them in two upper and lower arrays. However, an increase in the number of primary light sources gives rise to an increase in the thickness of an edge light illuminator and an increase in power consumption as well. This is in sharp contrast to present design goals of fabricating portable TV receiver sets, computers and word processors to be reduced in thickness so as to be more compact and more efficient so as to reduce power consumption.

In view of such situations as mentioned above, an object of the invention is to provide an edge light panel that achieves a much higher luminance while maintaining a reduced thickness and uniformity in profile, and a method of fabricating such an edge light panel.

SUMMARY OF THE INVENTION

The present invention is accomplished with a view to providing a solution to the problems mentioned above.

According to one aspect of the invention, there is provided an edge light panel including a transparent substrate, diffusing-reflection means formed on the back side said substrate, and reflective means that are integrally and closely stacked on said diffusing-reflection means to cover a part or all of said diffusing-reflection means. Preferably, said diffusing-reflection means are in semi-microspheric forms and said reflective means are formed substantially all over the surfaces of said diffusing-reflection means.

Preferably, said diffusing-reflection means are formed of UV curable, transparent ink by screen printing, and said reflective means are formed of UV curable, reflective ink containing a reflective pigment.

Preferably, said diffusing-reflection means are in minuscule rectangle or trapezoid configurations, and said reflective means are formed to cover a part of the top surface regions of said diffusing-reflection means.

Preferably, said diffusing-reflection means are formed of a solvent volatile type of curable ink by screen printing, and said reflective means are formed of heat transfer layers containing a reflective pigment by heat transfer.

Preferably, said solvent volatile type of curable ink contains minuscule beads.

Preferably, said diffusing-reflection means are formed of transparent resin that is integrally molded with said transparent substrate.

Preferably, the top surface region of said transparent resin is undulated.

Preferably, said diffusing-reflection means are in minuscule rectangle or trapezoid configurations, and said reflective means are formed of a reflective sheet, film or panel bonded to the top surface regions of said diffusing-reflection means to cover said top surface regions in continuously and partly manners.

According to another aspect of the invention there is provided a method of fabricating an edge light panel, which comprises the steps of providing the back side of a transparent substrate with a given dot pattern by screen printing that makes use of UV curable, transparent ink, curing the ink by exposure to ultraviolet rays to form a diffusing-reflection means, providing a given dot pattern all over the surface of said diffusing-reflection means with UV curable, reflective ink containing a reflective pigment by means of screen printing, and curing the ink by exposure to ultraviolet rays to form a reflective means on said diffusing-reflection means.

Preferably, after said step of curing the ink for said diffusing-reflection means, said steps of screen printing and ink curing are repeated.

Preferably, a heat transfer sheet containing a reflective pigment is applied on a transparent substrate including on its back side diffusing-reflection means formed of transparent ink by screen printing or formed of transparent resin by one-piece molding, thereby forming reflective means that cover partly the top surface regions of said diffusing-reflection means.

BRIEF DESCRIPTION OF THE DRAWINGS

The invention will now be explained, by way of example but not by way of limitation, with reference to the accompanying drawings, in which:

FIG. 1 is an exploded, perspective view of a liquid crystal backlight,

FIG. 2 is a longitudinal section of a liquid crystal backlight,

FIG. 3 is an enlarged, longitudinal section illustrating the relation of diffusing-reflection means to a reflective layer, FIG. 4 is an enlarged, longitudinal section illustrating how the diffusing-reflection means and reflective layer act, FIG. 7 is an enlarged, longitudinal section showing a further edge light panel according to the invention.

EXPLANATION OF THE PREFERRED EMBODIMENTS OF THE INVENTION

Figure 5:
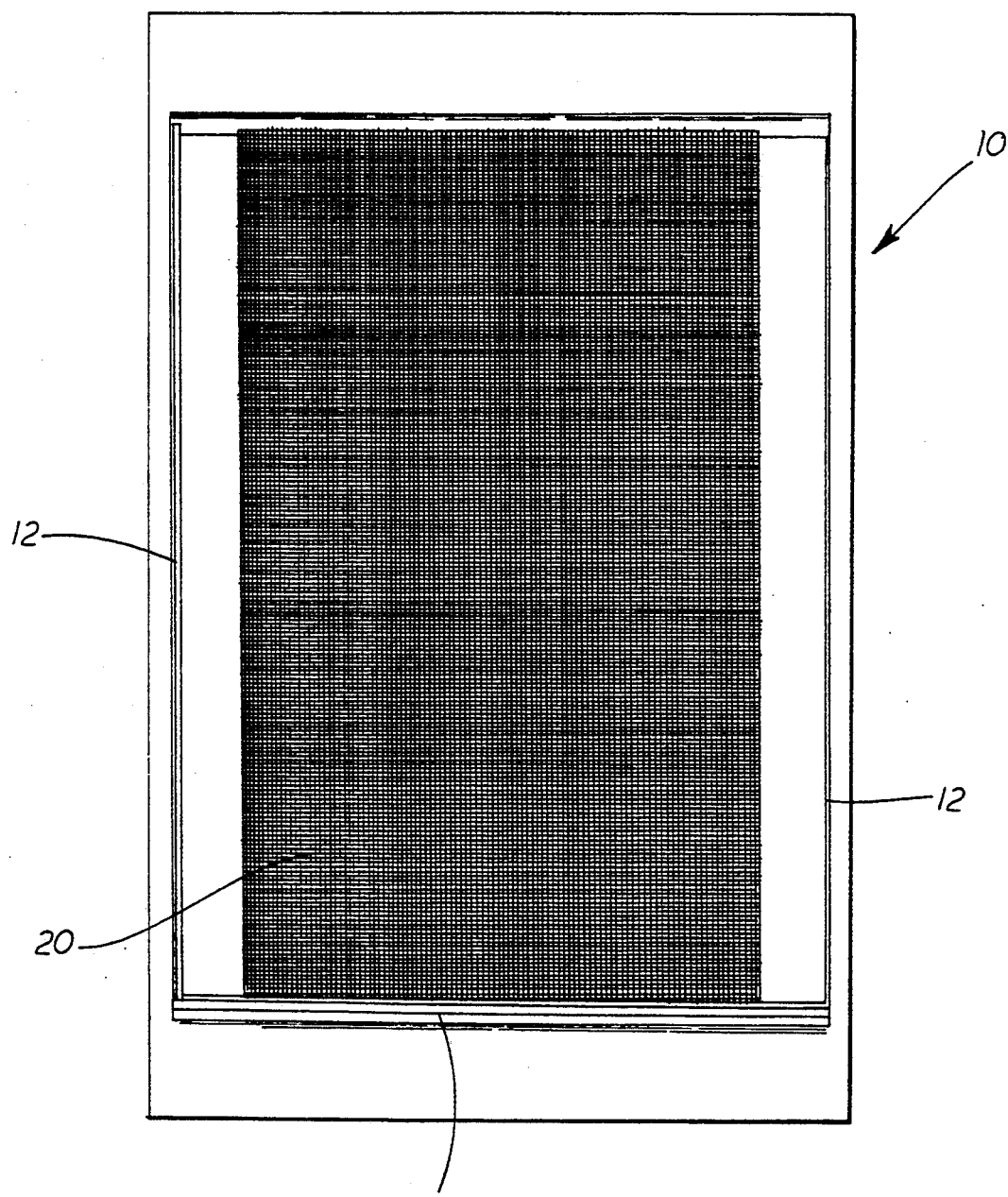
FIG. 5 is a rear view of one edge light panel according to the invention.

Referring first to FIGS. 1 to 5, there is shown a liquid crystal backlight generally shown at A, which is incorporated in liquid crystal display hardware. This liquid crystal backlight A is made up of, in order from the surface side of the liquid crystal display, a diffusion sheet 1 that is, for instance, 75 μm in thickness and is formed of a milk white polyester film, an edge light panel 10 and a reflective sheet 2 that is again 75 μm in thickness and is formed of a milk white film of polyester foamed at a low degree of foaming into a C-shape in section, all being stacked together. Both side edge surfaces of the edge light panel 10 define light-incident edge surfaces 12, on each of which a tubular primary light source 3 incorporating a cold-cathode tube is mounted. The reflective sheet 2 is provided to cover the edge light panel 10 and the primary light sources 3.

The edge light panel 10 is made up of a transparent substrate 11 of acrylic resin that is, for instance, 2 mm in thickness and 156 mm×200 mm in size, and this substrate is provided on its back side with a diffusing-reflection means 20 comprising a dot pattern and a reflective means 30 that is closely and integrally stacked on the diffusing-reflection means 20.

The dot pattern on the diffusing-reflection means 20 is defined by an equi-interval matrix array of dots. More particularly, this matrix array of dots is designed such that the dot percent is increased in a stepless manner from the light-incident edge surfaces 12 toward the middle region of the transparent substrate 11, at which it peaks or reaches the maximum, where the amount of diffused reflection of light is so controllable that uniform luminance can be achieved as a whole.

In the instant embodiment, the diffusing-reflection means 20 is defined by a number of semi-microspheres, and each semi-microsphere is covered by the reflective means 30 substantially all over the surface. The diffusing-reflection means 20 is formed of UV curable, transparent ink by means of screen printing, and the reflective means 30 is again formed of UV curable, reflective ink containing a reflective pigment by means of screen printing.

More specifically, the diffusing-reflection means 20 are defined by semi-microspheres having a radius of about 30 to 50 μm, for instance, and the reflective means 30 provides a close coverage on the overall surface of each semi-microsphere in such a way that its thickness decreases gradually from the top to lower end region of the means 20, giving a maximum radius of about 80 to 100 μm.

Both the diffusing-reflection and reflective means 20 and 30 are formed on the transparent substrate 11 according to the predetermined dot pattern with UV curable ink by means of screen printing and then curing the ink by exposure to ultraviolet rays. For the diffusing-reflection means 20, on the one hand, use may be made of ink comprising an ink medium and for the reflective means 30, on the other hand, use may be made of reflective ink such as a white ink containing titanium oxide as a reflective pigment.

The present invention will now be explained with reference to how to fabricate the edge light panel 10. The method of fabricating the edge light panel according to the invention comprises the steps of providing the back side of the transparent substrate 11 with a given dot pattern by screen printing that makes use of UV curable, transparent ink, curing the ink by exposure to ultraviolet rays to form the diffusing-reflecting means 20, providing a given dot pattern all over the surface of the diffusing-reflection means 20 with UV curable, reflective ink containing a reflective pigment by means of screen printing, and curing the ink by exposure to ultraviolet rays.

In the instant embodiment, the steps of printing the dot patterns for the means and may be carried out by means of screen printing utilizing a form plate having the same dot pattern. It is here noted that both the means 20 and 30 to be formed are in alignment and provided with the same amount of ink, whereby the means 30 can provide a coverage all over the surface of the means 20.

The ink used at the step of forming the diffusing-reflection means by screen printing may be one that is generally used for hard-coating the surface of printed matter, and may be a UV curable, transparent ink material that is additive-free or, in other words, is composed solely of an ink medium. The ink used at the step of forming the reflecting means by screen printing, on the other hand, may be one that is again used for hard-coating the surface of printed matter and may be a UV curable, reflective ink material to which titanium oxide is added as a reflective pigment.

Screen printing may be carried out in any desired, known manner. Since the ink used is of the non-solvent type that is curable by exposure to ultraviolet rays, the diffusing-reflection means 20 remain in the form of semi-microspheres after printing. The ink forming the reflective means 30 is applied to the diffusing-reflection means 20 with the same form plate, so that it can provide a coverage substantially all over the surfaces of the means 20. Thus, these inks can be cured while remaining intact in shape even after the lapse of an extended time.

The steps of curing the screen-printed dot patterns may be carried out by exposure to ultraviolet rays, providing the means 20 and 30 in a completed form.

By way of example alone, the exposure of the dot ink patterns to ultraviolet rays may be done by passing the transparent substrate 11 with the dot patterns printed thereon through a UV irradiator having an ultraviolet lamp of 80 w/cm at a feed speed of 0.45 m/minute for about 5 seconds.

Through the steps of screen-printing the dot pattern for the diffusing-reflection means, curing the dot pattern by exposure to ultraviolet rays, screen-printing the dot pattern for the reflective means and curing the dot pattern by exposure to ultraviolet rays, there can be obtained an edge light panel including the diffusing-reflection means 20 and the reflective means 30 that is integrally and closely stacked thereon, With this fabrication method making use of ultraviolet curable ink, it is possible to set up an automatic fabrication line basically built up of a screen printer, a UV irradiator, a screen printer and a UV irradiator, which are connected by way of a belt conveyor so as to pass the transparent substrates 11 successively through them. This in turn makes it possible to fabricate edge light panels in a fully automated manner.

In the edge light panel 10 according to the embodiment mentioned above, the reflective means 30 enables light incident on the diffusing-reflection means 20 to be reflected as much as possible, preventing dissipation of the incident light from the back side of the edge light panel 10 and thereby giving rise to some considerable increase in luminance. Further, both the means 20 and 30 act in the form of a condenser lens, so that, as shown in FIG. 4, light from the primary light source 3, is focused on a focal point P that lies within the plane defined by each diffusing-reflection means 20 and in the thickness of the edge light panel, enabling that focal point to emit more intense light and thereby making a great contribution to a luminance increase. Experimentation indicated that the edge light panel according to the instant embodiment achieves a luminance as high as about 3,100 cd/cm$^2$ that is an about 40% higher than a conventional one.

Figure 6:
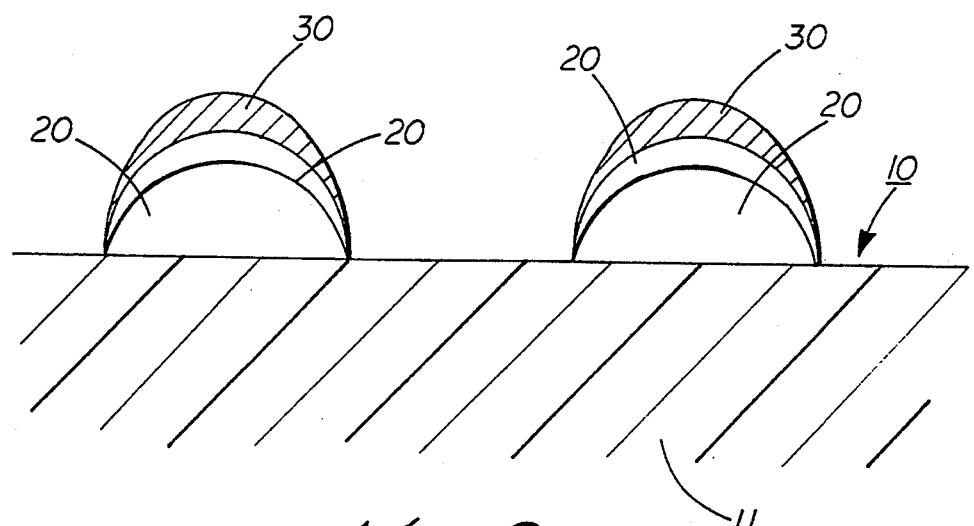
FIG. 6 is an enlarged, longitudinal section showing another edge light panel according to the invention.

Referring then to FIG. 6 that represents another embodiment of the edge light panel according to the invention, diffusing-reflection means 20 in semi-microspheric forms are formed by providing each semi-microsphere in two or more layers with UV curable, transparent ink and providing an integral and close coverage on its surface in similar manners as mentioned above.

According to the instant embodiment, the edge light panel 10 may be fabricated through the steps of printing a given dot pattern for the means 20 and curing the dot pattern, the steps of printing an additional dot pattern for the means 20 and curing the dot pattern, and printing a given dot pattern for the means 30 and curing the dot pattern.

The edge light panel 10 according to the instant embodiment again achieves a high luminance.

Referring then to FIG. 7 that represents a further embodiment of the edge light panel according to the invention, diffusing-reflection means 20 are formed in minuscular rectangle or trapezoid forms and the reflective means 30 is overlapped on the top surface of each diffusion-reflection means 20.

In the instant embodiment, the diffusing-reflection means 20 is comprised of a generally used solvent type ink vehicle 21 and a small amount of minuscule beads 22 added thereto, and is formed by screen-printing on the substrate a solvent volatile type of curable, transparent ink in which a small amount of minuscule beads 22 is incorporated in the solvent type ink vehicle 21. The means 20 has a height of about 20 to 30 μm, and is provided thereon with a thermal transfer layer containing a reflective pigment that forms the reflective means 30.

The minuscule beads 22 are juxtaposed in the top region of the ink vehicle 21, and are particularly formed of hollow beads of transparent acrylic resin so as to promote diffused reflection of light. Then, the ink is cured by natural or moderate drying rather than by forced drying by heating, whereby the minuscule beads 22 are juxtaposed in the top region of the ink vehicle 21 due to a specific gravity difference.

Thus, while the ink is cured, the diffusing-reflection means 20 in minuscule rectangle or trapezoid forms are made substantially flat at the top regions with the minuscule beads 22 being juxtaposed therein.

The reflective means 30, on the other hand, are formed by the transfer layers in which a binder is used to retain titanium oxide acting as a reflective pigment.

To be more specific, a heat transfer sheet containing a reflective pigment is applied on the transparent substrate 11 having the diffusing-reflection means 20 of transparent ink screen-printed thereon, so that the reflective means 30 are overlapped on the top regions of the means 20. In this manner, the edge light panel 10 can be fabricated.

Used to this end is a commercially available, white heat transfer sheet that contains titanium oxide toner and is generally used for drawing materials, for instance. This heat transfer sheet is then placed on the diffusing-reflection means 20 of the transparent substrate 11. Subsequently, it is heated at 80° C. and treated by a roller, so that it can be thermally transferred on the top regions of the diffusing-reflection means 20 to form the white reflective means 30.

In this connection, it is noted that the heat transfer sheet must be placed under some tension so as to prevent any heat transfer layer from being formed on portions of the transparent substrate 11 other than the diffusing-reflection means 20.

The means 30 are formed under otherwise similar conditions. In the thus obtained edge light panel 10, any dissipation of incident light from the back side of the edge light panel can be avoided, giving rise to a remarkable luminance increase. Experimentation indicated that there can be achieved a luminance of about 2,800 cd/m$^2$ that is an about 30% higher than would be possible with a conventional edge light panel.

It is noted that when the minuscule beads 22 are dispersed in the diffusing-reflection means 20, the luminance mentioned above is likely to drop by 10% or thereabround. Thus, although the prevention of the incident light dissipation mentioned above is not fully responsible for the luminance increase, it is believed that it takes a substantial role.

Figure 8:
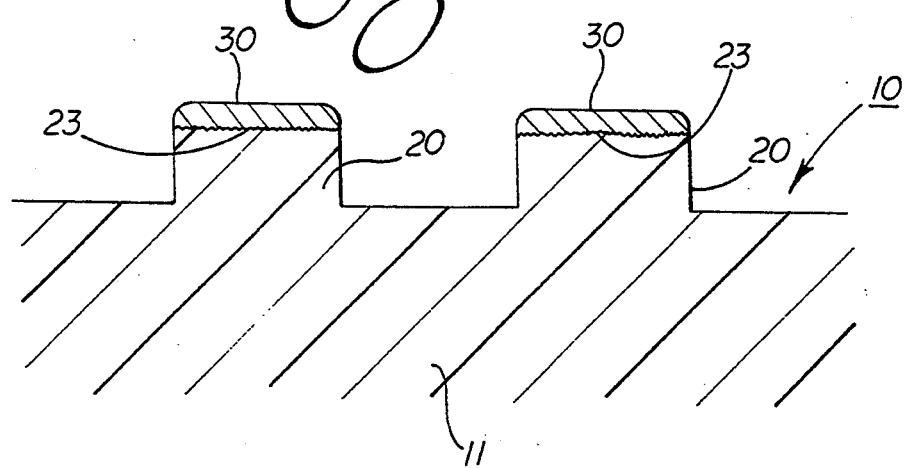
FIG. 8 is an enlarged, longitudinal section showing a still further edge light panel according to the invention.
Figure 9:
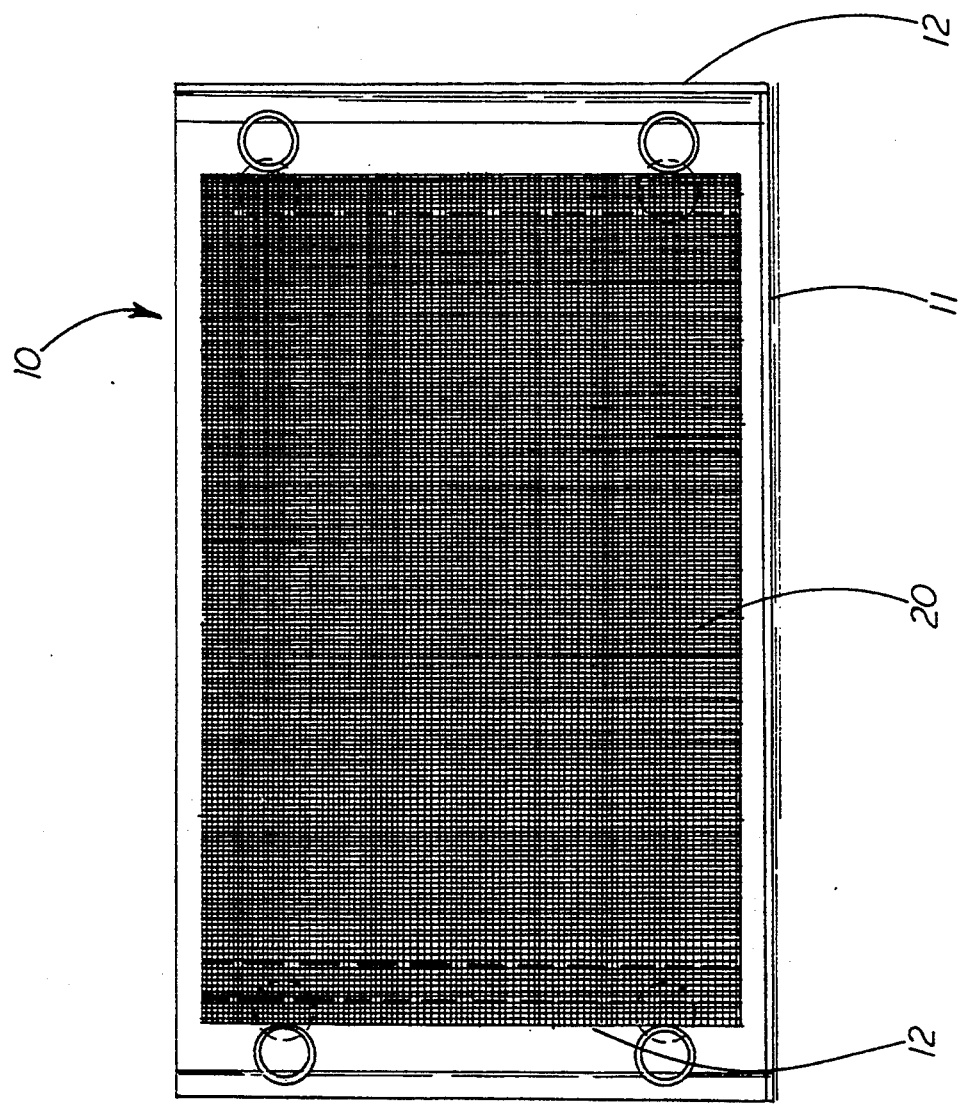
FIG. 9 is a rear view of a still further edge light panel according to the invention.

Referring then to FIGS. 8 and 9 that show a still further embodiment of the invention, diffusing-reflection means 20 are formed by acrylic resin that is molded as a piece integral with a transparent substrate 11. Reflective means 30 are defined by transfer layers containing a reflective pigment by means of heat transfer, as is the case with the FIG. 7 embodiment.

The diffusing-reflection means 20 are again defined by a dot pattern. The dot pattern on the diffusing-reflection means 20 is defined by an equi-interval matrix array of dots. More particularly, this matrix array of dots is designed such that the dot percent increases and reaches the maximum at a position intermediate between an edge surface 12 on which light from a single primary light surface 3 strikes and an edge surface 13 on which any light does not strike and which is mirror-finished so as to increase its reflectivity.

In the instant embodiment, the diffusing-reflection means 20 formed of transparent resin is further undulated on their top regions.

In the edge light panel 10 according to the instant embodiment that is obtained by one-piece molding, the transparent substrate 11 used is of relatively small size, for instance, 4 mm in thickness and 77 mm × 125 mm in dimensions so as to prevent it from warping during molding, and the diffusing-reflection means 20 are correspondingly formed to a height of 20 to 30 μm.

The transparent substrate 11 having the diffusing-reflection means 20 is formed with a mold that is provided with a given dot pattern by means of photoetching. Photoetching is carried out with an acid or alkali under conditions controlled as to etching time, the quantity of an etchant, etc., whereby the bottom walls of the etched dots are undulated. Preferable results are obtained by selecting the degree of undulation between 0427 and 0797.

The diffusing-reflection means 30 formed of transparent resin by means of one-piece molding, because of being undulated on the top regions, is effective for promoting diffused reflection of light. It is noted, however, that the means 20 are made flat enough to allow reflective means 30 to be formed by heat transfer.

The reflective means 30 is formed by the same heat transfer as mentioned above. The thus obtained edge light panel is found to achieve a luminance much higher than would be possible with a conventional edge light panel.

Figure 11:
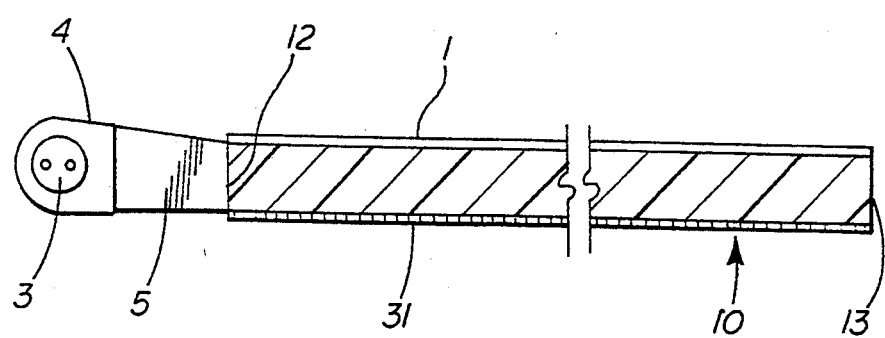
FIG. 11 is a longitudinal section of the liquid crystal backlight.
Figure 10:
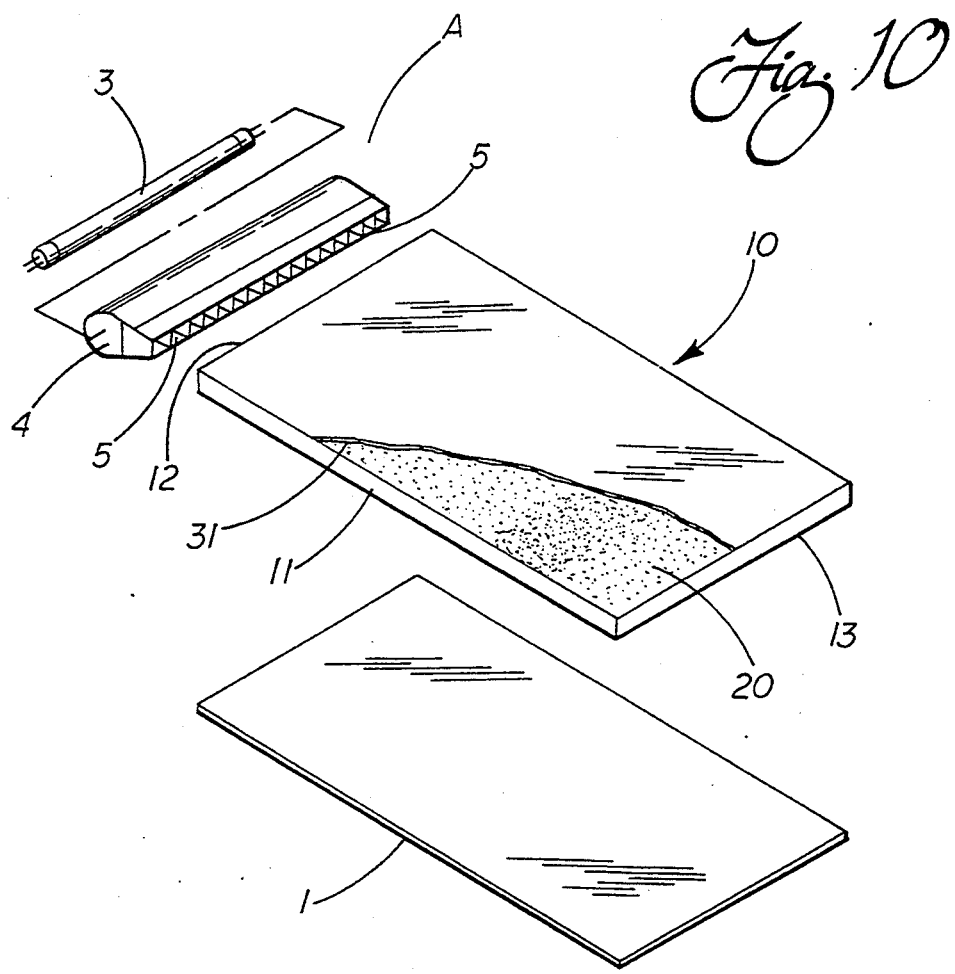
FIG. 10 is an exploded, perspective view of another liquid crystal backlight according to the invention.
Figure 12:
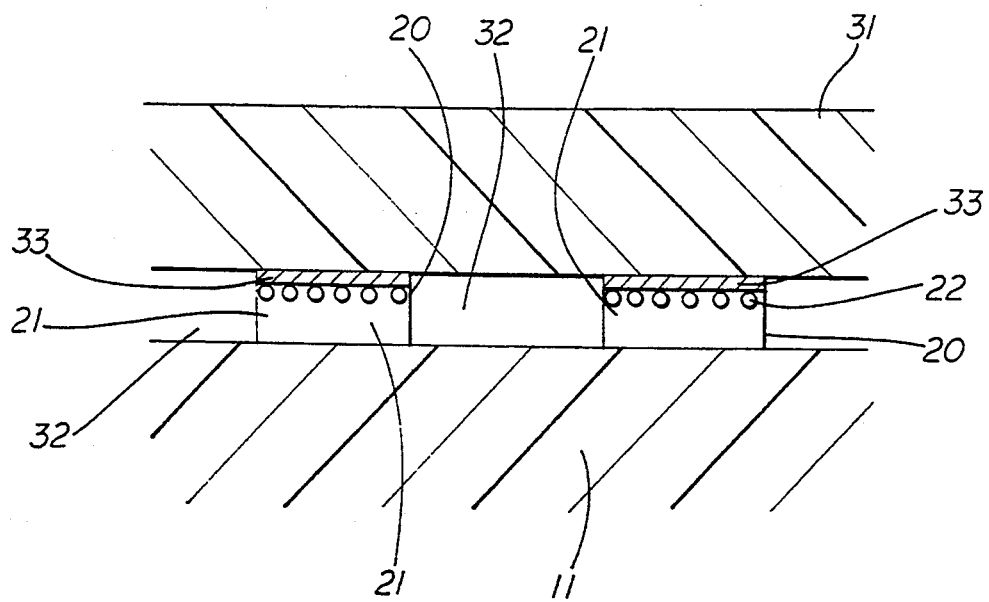
FIG. 12 is an enlarged, longitudinal section of the relation of diffusing-reflection means to reflective means.

Referring finally to FIGS. 10, 11 and 12 that show a still further embodiment of the edge light panel of the invention, diffusing-reflection means 20 in minuscule rectangle or trapezoid forms are formed of transparent ink by screen printing or one-piece molding with a transparent substrate 11. Reflective means 31 is formed of a reflective sheet that is bonded to the top surface regions of the means 20 in such a way that it covers them in a partial and continuous manner.

For the reflective sheet according to the instant embodiment, use is made of a white film of polyester foamed at a low foaming degree that is 188 μm in thickness, as is the case of the above reflective sheet 2. The reflective sheet is then placed on the transparent substrate 11 with a minuscule gap 32 between them, and is then bonded to the respective diffusing-reflection means 20 under some tension.

The bonding of the reflective means 31 to the diffusing-reflection means 20, for instance, is achieved by coating a transparent bonding agent 33 all over the surface of one side of the reflective sheet 31 and then treating it with a roller while it is being heated at about 80° C.

In connection with FIGS. 10 and 11, it is noted that reference numeral 4 is a lamp house that includes a number of rectangular reflective domains between a primary light source 3 and the light-incident edge surface of the edge light panel 10. These domains have been aluminized by vapor deposition after resin molding, so that light from the primary light source 3 thereon can be diffusely reflected as much as possible. The instant embodiment achieves a high luminance, as is the case with the above embodiments.

In carrying out the invention, it is preferable that the diffusing-reflection means 20, which may be formed by either printing or one-piece molding, have a height of 20 to up to 50 μm with respect to the transparent substrate. In other words, the diffusing-reflection means 20, if in recessed forms, are not suitable. Although depending on the properties of the ink used for forming dots, curing time and molding conditions, the means 20 may be of various shapes in section, such as columnar, trapezoidal, triangular or round shapes, and may be curved, rounded or flatted on the top surfaces, by way of example but not by way of limitation.

When providing by screen printing, the diffusing-reflection means may be made up of an ink layer that further contains a white pigment. In order to prevent the loss of incident light as much as possible, however, it is preferable that the diffusing-reflection means is made up of transparent ink and minuscule beads, because a much higher luminance is achievable. The minuscule beads used, by way of example alone, may be hollow, minuscule beads of transparent acrylic resin, minuscule beads of transparent glass (quartz) and hollow, minuscule beads that are filled in the hollows with reflective material such as powdery titanium oxide or aluminum.

The pattern forming the diffusing-reflection means, which may be formed by not only one-piece molding but other procedures as well, may be provided by a radial array of lines extending from the light-incident edge surface of the panel and an array of lines intersecting therewith or a radial pattern of dots that is defined by arranging dots at the points of intersection of these lines, by way of example and not by way of limitation. In either case, a uniform high luminance is achievable.

In addition, the reflective means may be formed as by printing or vapor deposition. In this connection, it is noted that the printing or vapor deposition of the transparent substrate itself should be avoided as by providing a precise form plate or masking the substrate.

If the transparent substrate itself is screen-printed, provided with transfer layers, vapor-deposited or otherwise processed, it absorbs incident light, resulting in an undesirable luminance decrease. In other words, any arrangement in which the reflective means are closely provided all over the surfaces of the diffusing-reflection means and transparent substrate is not suitable for the edge light panel of the invention.

In order to form the reflective means on the diffusing-reflection means in a relatively simple manner, use may be made of screen printing using UV curable ink or heat transfer. However, when heat transfer is done by pressing, the heat transfer sheet may in some cases be transferred on the transparent substrate itself due to its loosening. It is thus preferable that the heat transfer sheet is pressed under some tension to avoid this problem.

Heat transfer, when done, should be carried out at a temperature lower than about 130° C., because the transparent substrate of acrylic resin is affected by its fusion occurring at that temperature and provides an unsuitable edge light panel. It is thus preferable that heat transfer is carried out at a temperature of up to about 80° C., because that temperature has no adverse influence on the transparent substrate and ensures to induce heat transfer.

With the reflective means that generally contains a white pigment such as titanium oxide toner, it is possible to obtain an edge light panel having a high-enough luminance. However, even when metallic toner such as aluminum toner is used as the reflective pigment, a high-enough luminance is again achievable.

When a sheet form of reflective means is used as the reflective means, use may be made of a polyester sheet formed of polyester foamed at a low foaming degree, an aluminum foil or a resin base on which a reflective metal such as silver is vapor-deposited. The reflective means is not critical as to thickness, unless the thickness of the edge light panel is substantially and largely limited. Thus, some film, some reflective metal sheet of up to about 1 mm in thickness or some mirror panel obtained by the vapor deposition of a metal on a resin base may be used.

When the reflective means is closely bonded to the diffusing-reflection means by an adhesive or hot-pressing, it is required that there be a slight gap of about several tens' μm between the transparent substrate and the reflective means. Thus, it is required that the sheet or film form of reflective means, when provided, be bonded to the diffusing-reflection means under some tension so as to prevent any bonding of it to the transparent substrate.

Although not illustrated, the diffusing-reflection means may be formed of transparent resin by one-piece molding, while the reflective means may be formed of UV curable ink by screen printing. Alternatively, the former may be formed of a solvent volatile type of curable ink by screen printing, while the latter may be formed of UV curable ink. Still alternatively, the former may be formed of UV curable ink by screen printing, while the latter may be made of a vapor-deposited layer. The reflective means may be designed to cover a part of the diffusing-reflection means, for instance, a part of the diffusing-reflection means that lies from the top to side.

In carrying out the invention, many modifications may be made as to the material, configuration, construction and other factors of the transparent substrate, diffusing-reflection means, reflective means, UV curable, transparent ink, a solvent volatile type of curable ink, transparent resin formed by one-piece molding, minuscule beads, screen printing and heat transfer without departing from the purport of the invention. For instance, edge surface portions of the edge light panel other than the light-incident edge surface may be mirror-finished and/or provided with a reflective tape. The light-incident edge surface may be undulated so as to promote diffused reflection of incident light. For the primary light source, hardware improved to have a much higher luminance can always be used. For instance, the use of a recently developed cold cathode tube of 3 mm in diameter achieves a luminance of 28,000 to 30,000 $cd/m^2$. The edge light panel of the invention may be used not only on liquid crystal backlights but also on other edge light illuminators.

What we claim is:

1. An edge light panel including a transparent substrate, diffusing-reflection means formed on a back side of said transparent substrate, and reflective means that are integrally and closely stacked on said diffusing-reflection means to cover at least a part of said diffusing-reflection means, said diffusing-reflection means being in semi-microspheric forms and said reflective means being formed only upon surfaces of said diffusing-reflection means while said back side of said transparent substrate remains free of said reflective means; said edge light panel being further characterized by said diffusing-reflection means being formed by screen printing of a solvent volatile type of curable ink containing minuscule beads and said reflective means being formed of heat transfer layers containing a reflective pigment by heat transfer.

2. An edge light panel including a transparent substrate, diffusing-reflection means formed on a back side of said transparent substrate, and reflective means that are integrally and closely stacked on said diffusing-reflection means to cover at least a part of said diffusing-reflection means, said diffusing-reflection means being in semi-microspheric forms and said reflective means being formed only upon surfaces of said diffusing-reflection means while said back side of said transparent substrate remains free of said reflective means; said edge light panel being further characterized by said diffusing-reflection means being formed as minuscule rectangular configurations by screen printing of a solvent volatile type of curable ink containing minuscule beads, and said reflective means being formed of heat transfer layers containing a reflective pigment by heat transfer to cover a part of top surface regions of said diffusing-reflection means.

3. An edge light panel including a transparent substrate, diffusing-reflection means formed on a back side of said transparent substrate, and reflective means that are integrally and closely stacked on said diffusing-reflection means to cover at least a part of said diffusing-reflection means, said diffusing-reflection means being in semi-microspheric forms and said reflective means being formed only upon surfaces of said diffusing-reflection means while said back side of said transparent substrate remains free of said reflective means; said edge light panel being further characterized by said diffusing-reflection means being formed as minuscule trapezoidal configurations by screen printing of a solvent volatile type of curable ink containing minuscule beads, and said reflective means being formed of heat transfer layers containing a reflective pigment by heat transfer to cover a part of top surface regions of said diffusing-reflection means.

4. An edge light panel including a transparent substrate, diffusing-reflection means formed on a back side of said transparent substrate, and reflective means that are integrally and closely stacked on said diffusing-reflection means to cover at least a part of said diffusing-reflection means, said diffusing-reflection means being in semi-microspheric forms and said reflective means being formed only upon surfaces of said diffusing-reflection means while said back side of said transparent substrate remains free of said reflective means; said edge light panel being further characterized by said diffusing-reflection means being formed of transparent resin that is integrally molded with said transparent substrate.

5. An edge light panel as claimed in claim 4, wherein the top surface region of said transparent resin is undulated.

6. An edge light panel including a transparent substrate, diffusing-reflection means formed on a back side of said transparent substrate, and reflective means that are integrally and closely stacked on said diffusing-reflection means to cover at least a part of said diffusing-reflection means, said diffusing-reflection means being in semi-microspheric forms and said reflective means being formed only upon surfaces of said diffusing-reflection means while said back side of said transparent substrate remains free of said reflective means; said edge light panel being further characterized by said diffusing-reflection means being in minuscule rectangular configurations formed of transparent resin that is integrally molded with said transparent substrate and said reflective means being formed to cover a part of top surface regions of said diffusing-reflection means.

7. An edge light panel as claimed in claim 6, wherein the top surface region of said transparent resin is undulated.

8. An edge light panel including a transparent substrate, diffusing-reflection means formed on a back side of said transparent substrate, and reflective means that are integrally and closely stacked on said diffusing-reflection means to cover at least a part of said diffusing-reflection means, said diffusing-reflection means being in semi-microspheric forms and said reflective means being formed only upon surfaces of said diffusing-reflection means while said back side of said transparent substrate remains free of said reflective means;

said edge light panel being further characterized by said diffusing-reflection means being in minuscule trapezoidal configurations formed of transparent resin that is integrally molded with said transparent substrate and said reflective means being formed to cover a part of top surface regions of said diffusing-reflection means.

9. An edge light panels claimed in claim 8, wherein the top surface region of said transparent resin is undulated.

* * * * *